(12) United States Patent
Chen

(10) Patent No.: US 12,471,742 B2
(45) Date of Patent: Nov. 18, 2025

(54) TOWEL HEATING BARREL

(71) Applicant: SHENZHEN SHANGLONG REFRIGERATION ELECTRIC CO., LTD, Guangdong (CN)

(72) Inventor: Chuanqing Chen, Jiangsu (CN)

(73) Assignee: SHENZHEN SHANGLONG REFRIGERATION ELECTRIC CO., LTD, Shenzhen (CN)

( * ) Notice: Subject to any disclaimer, the term of this patent is extended or adjusted under 35 U.S.C. 154(b) by 0 days.

(21) Appl. No.: 18/421,977

(22) Filed: Jan. 24, 2024

(65) Prior Publication Data

US 2025/0221583 A1    Jul. 10, 2025

(30) Foreign Application Priority Data

Jan. 5, 2024   (CN) .......................... 202410017394.5
Jan. 5, 2024   (CN) .......................... 202410023672.8
(Continued)

(51) Int. Cl.
*A47K 10/02*      (2006.01)
*A61L 2/04*       (2006.01)
(Continued)

(52) U.S. Cl.
CPC ............ *A47K 10/025* (2013.01); *A47K 10/02* (2013.01); *A61L 2/04* (2013.01); *A61L 2/24* (2013.01);
(Continued)

(58) Field of Classification Search
CPC .. A47K 10/025; A47K 10/02; B65D 81/3806; H05B 3/26; H05B 3/28;
(Continued)

(56) References Cited

U.S. PATENT DOCUMENTS

| | | | |
|---|---|---|---|
| 6,610,382 B1 * | 8/2003 | Kobe ..................... | A63B 60/10 428/104 |
| 8,481,895 B2 * | 7/2013 | Taylor .................... | A47K 10/06 219/535 |

(Continued)

FOREIGN PATENT DOCUMENTS

| CN | 106039335 A | * | 10/2016 |
|---|---|---|---|
| CN | 208541225 U | * | 2/2019 |

OTHER PUBLICATIONS

Logic Signal Voltage Levels—Electrical Engineering, Circuit Bread, 2022 (Year: 2022).*

*Primary Examiner* — Elizabeth M Kerr
*Assistant Examiner* — Simpson A Chen

(57) ABSTRACT

A towel heating barrel is provided and includes: a barrel body, having a receiving space to receive a to-be-heated object; a barrel cover, connected to the barrel body and capable of being disposed at a first position or a second position, wherein the first position is the barrel cover being closed with respect to the barrel body; the second position is the barrel cover being open with respect to the barrel body; a first detection assembly, configured to detect whether the object is received in the receiving space to obtain a first detection result; and a heating assembly, arranged on the barrel body to heat the barrel body to further heat the object received in the receiving space, wherein the heating assembly is configured to stop generating heat based on the first detection result.

17 Claims, 12 Drawing Sheets

(30) Foreign Application Priority Data

Jan. 5, 2024 (CN) .......................... 202410029143.9
Jan. 5, 2024 (CN) .......................... 202420046245.7

(51) Int. Cl.
*A61L 2/24* (2006.01)
*B65D 81/38* (2006.01)
*H05B 3/26* (2006.01)
*H05B 3/28* (2006.01)

(52) U.S. Cl.
CPC ........... *B65D 81/3806* (2013.01); *H05B 3/26* (2013.01); *H05B 3/28* (2013.01); *A61L 2202/14* (2013.01); *A61L 2202/26* (2013.01)

(58) Field of Classification Search
CPC .......... A61L 2/04; A61L 2/24; A61L 2202/14; A61L 2202/26
USPC ........................................................ 219/521
See application file for complete search history.

(56) References Cited

U.S. PATENT DOCUMENTS

| | | | | |
|---|---|---|---|---|
| 9,277,320 | B1* | 3/2016 | Hoskins | H04R 5/033 |
| 10,395,493 | B1* | 8/2019 | Simmons | G08B 13/14 |
| 2005/0076453 | A1* | 4/2005 | Lucas | D06L 4/657 |
| | | | | 8/115.51 |
| 2005/0120577 | A1* | 6/2005 | Nakamoto | D06F 58/50 |
| | | | | 34/77 |
| 2006/0049172 | A1* | 3/2006 | Gagas | F24C 15/18 |
| | | | | 219/521 |
| 2012/0314410 | A1* | 12/2012 | Leard | G01N 21/255 |
| | | | | 362/257 |
| 2015/0312964 | A1* | 10/2015 | Sorenson | H05B 1/0266 |
| | | | | 219/443.1 |
| 2018/0064296 | A1* | 3/2018 | Jun | A61L 9/18 |
| 2019/0127905 | A1* | 5/2019 | Kim | D06F 58/45 |
| 2019/0321499 | A1* | 10/2019 | Igarashi | A61L 2/26 |
| 2022/0287517 | A1* | 9/2022 | Schwartz | H05B 3/26 |
| 2023/0141834 | A1* | 5/2023 | Kajuch | A47K 10/00 |
| | | | | 34/90 |
| 2024/0060340 | A1* | 2/2024 | Peng | B65D 25/2841 |

* cited by examiner

TOWEL HEATING BARREL

CROSS REFERENCE TO RELATED APPLICATIONS

The present application claims the benefit of Chinese Patent Application Nos. 202410017394.5, 202420046245.7, 202410029143.9 and 202410023672.8 filed on Jan. 5, 2024. All the above are hereby incorporated by reference in their entirety.

TECHNICAL FIELD

The present disclosure relates to the field of heating barrels, and in particular to a towel heating barrel.

BACKGROUND

Towel heating barrel is a device that can heat towels. The towel heating barrel supplies heat to the towel constantly. After being heated, the towel heating barrel may be used the user in winter, and the towel is sterilized by high temperatures.

In the art, the towel heating barrel has a barrel cover, a barrel body and a heating assembly. When the barrel is in use, the cover is usually opened relative to the barrel body, towels and other fabrics may be placed in a receiving space of the barrel body. Further, the cover is closed relative to the barrel body, and a control panel is manually operated by the user to control the heating assembly to start heating. After usage, the control panel is usually manually operated to turn off the heating assembly. Therefore, the towel heating barrel in the art may be less intelligent and cannot be used conveniently. Therefore, the towel heating barrel in the art needs to be improved.

SUMMARY OF THE DISCLOSURE

The present disclosure provides a towel heating barrel to solve the above technical problem.

In a first aspect, a towel heating barrel is provided and includes: a barrel body, having a receiving space to receive a to-be-heated object; a barrel cover, connected to the barrel body and capable of being disposed at a first position or a second position, wherein the first position is the barrel cover being closed with respect to the barrel body to close an opening of the receiving space; the second position is the barrel cover being open with respect to the barrel body to expose at least a portion of the opening of the receiving space; a first detection assembly, configured to detect whether the to-be-heated object is received in the receiving space to obtain a first detection result; and a heating assembly, arranged on the barrel body to heat the barrel body to further heat the to-be-heated object received in the receiving space, wherein the heating assembly is configured to selectively generate heat based on the first detection result.

DETAILED DESCRIPTION

Technical solutions in embodiments of the present disclosure will be described below by referring to the accompanying drawings in the embodiments of the present disclosure. Apparently, the described embodiments are only a part of but not all of the embodiments of the present disclosure. All other embodiments, which are obtained by the any ordinary skilled person in the art based on the embodiments in the present disclosure without making creative work, shall fall within the scope of the present disclosure.

Figure 1A:
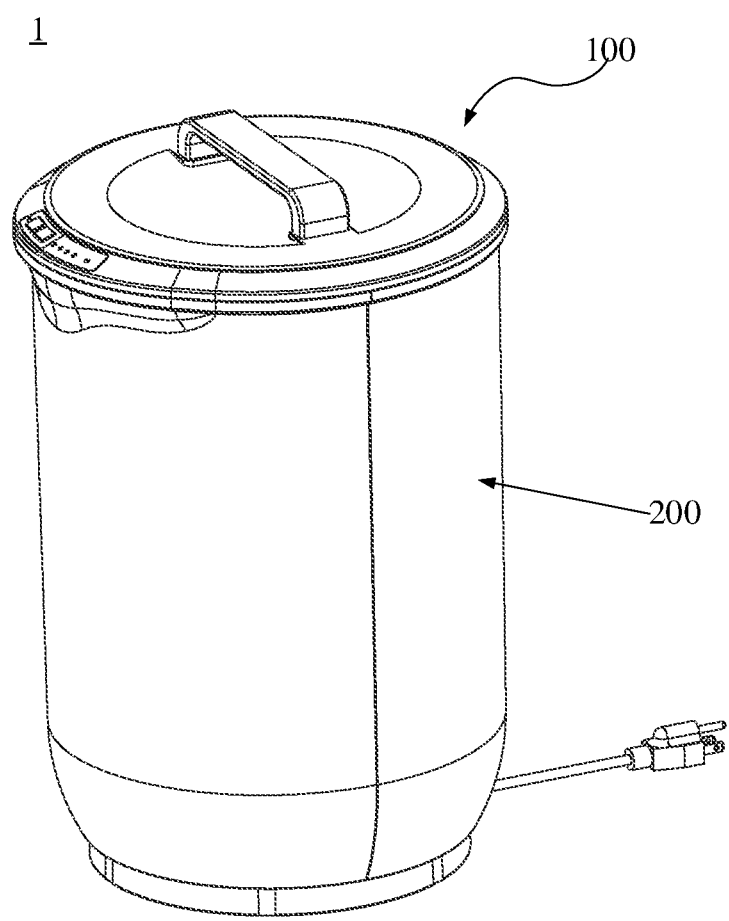
FIG. 1a is a structural schematic view of a towel heating barrel according to an embodiment of the present disclosure.
Figure 1B:
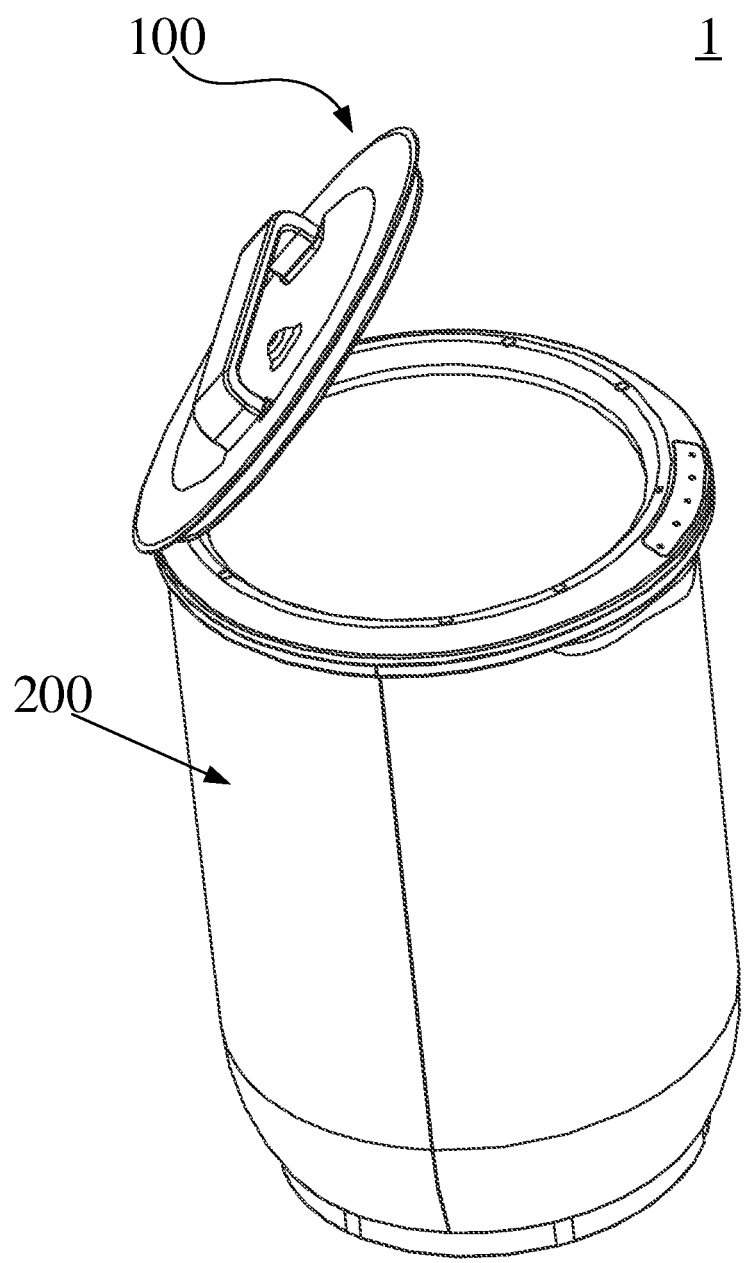
FIG. 1b is another structural schematic view of a towel heating barrel according to an embodiment of the present disclosure.
Figure 2A:
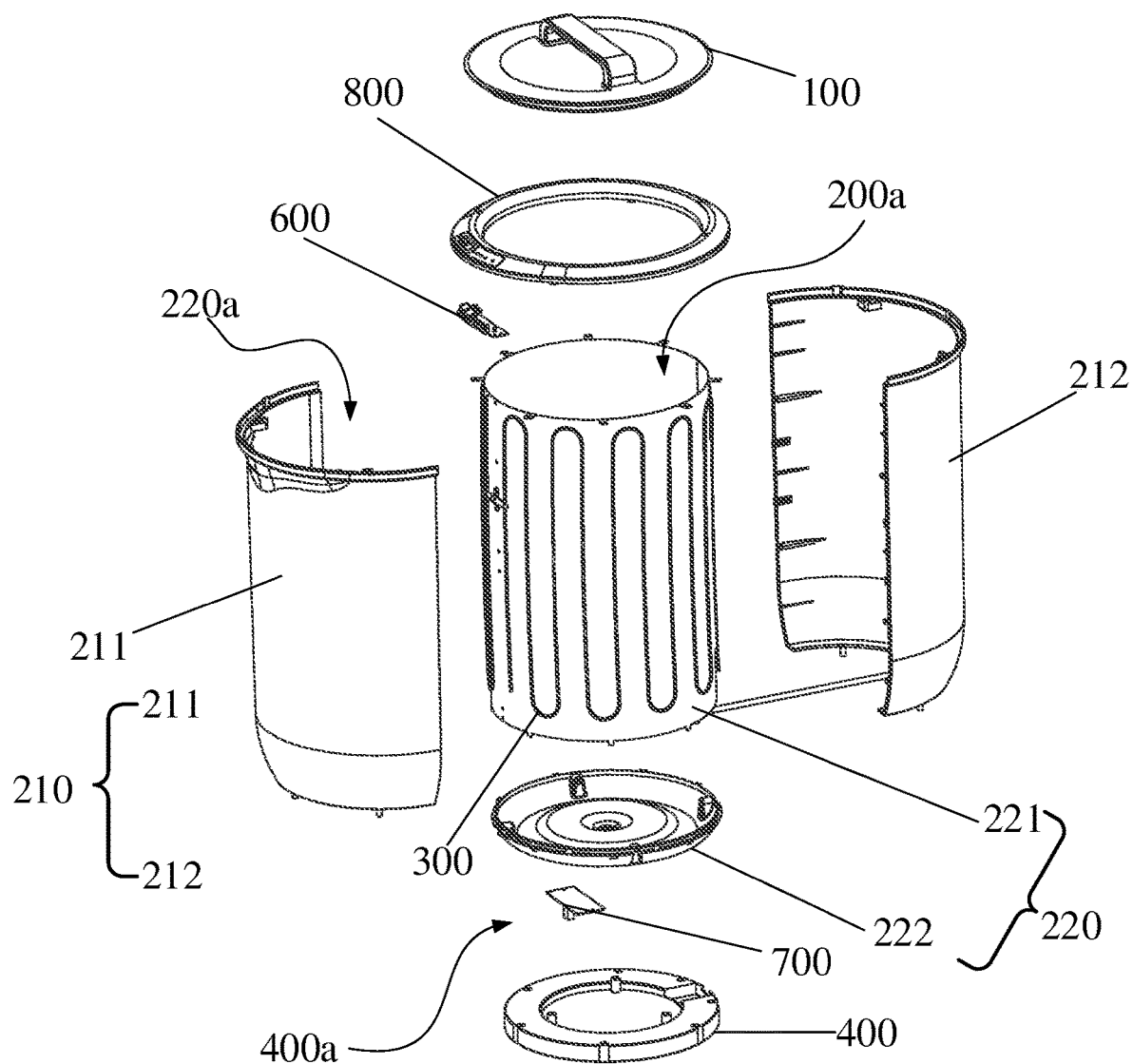
FIG. 2a is a structural schematic view of a towel heating barrel according to an embodiment of the present disclosure.

As shown in FIG. 1a, FIG. 1b, and FIG. 2a, the present disclosure provides a towel heating barrel 1 including a barrel cover 100, a barrel body 200 connected to the barrel cover 100, and a heating assembly 300 arranged on the barrel body 200.

The barrel body 200 has a receiving space 200a to receive any to-be-heated object. The to-be-heated object includes towels, fabrics, or any other substance that can be heated. In the following embodiments, towel is taken as an example for illustration only. The barrel cover 100 is openably connected to the barrel body 200. Specifically, the barrel cover 100 is capable of being arranged in a first position and a second position. As shown in FIG. 1a, when the barrel cover 100 is disposed at the first position, the barrel cover 100 is closed relative to the barrel body 200 to seal an opening of the receiving space 200a. As shown in FIG. 1b, when the barrel cover 100 is disposed at the second position, the barrel cover 100 is open with respect to the barrel body 200 to expose at least a portion of the opening of the receiving space 200a.

In the present embodiment, the barrel body 200 includes a barrel housing 210 and an inner barrel 220. The receiving space 200a is defined in the inner barrel 220. The barrel housing 210 is disposed around an outer peripheral wall of the inner barrel 220 and is spaced apart from the outer peripheral wall of the inner barrel 220. That is, a barrel gap 220a is defined between the outer peripheral wall of the inner barrel 220 and the barrel housing 210. In the present embodiment, the barrel housing 210 includes a first outer housing 211 and a second outer housing 212 connected to the first outer housing 211. The first outer housing 211 and the second outer housing 212 are symmetrically disposed to each other. For example, the first housing 211 is disposed corresponding to a left half of the peripheral wall of the inner barrel 220, and the second housing 212 is disposed corresponding to a right half of the peripheral wall of the inner barrel 220.

The first housing 211 has a first edge parallel to a central axis of the barrel body 200 and a first connecting member. The first connecting member is disposed on the first edge and/or at a position of an inner wall of the first housing 211 that is facing towards the receiving space 200a and near the first edge. The second housing 212 has a second edge parallel to the center axis of the barrel body 200 and a second connecting member. The second connecting member is disposed on the second edge and/or at a position of an inner wall of the second housing 212 that is facing the receiving space 200a and near the second edge. The first connecting member may be connected with the second connecting member, such that the first housing 211 is connected with the second housing 212.

In some embodiments, the barrel housing 210 may be configured as an integral and one-piece structure.

In the present embodiment, the heating assembly 300 is received in the barrel gap 220a and is disposed on the outer peripheral wall of the inner barrel 220. The inner barrel 220 may be made of a material having high thermal conductivity, such as metal, and more specifically, such as iron. In this way, when the heating assembly 300 is generating heat, the inner barrel 220 may be heated in a relatively short period of time to increase a temperature of the receiving space 200a to rapidly heat the towel received in the receiving space 200a. It is understood that the barrel gap 220a provides a space for receiving the heating assembly 300 and further insulates the inner bucket 220 from the outside of entire towel heating barrel, such that thermal insulation is achieved, and heat of the inner barrel 220 and the receiving space 200a may not be dissipated easily.

Figure 3:
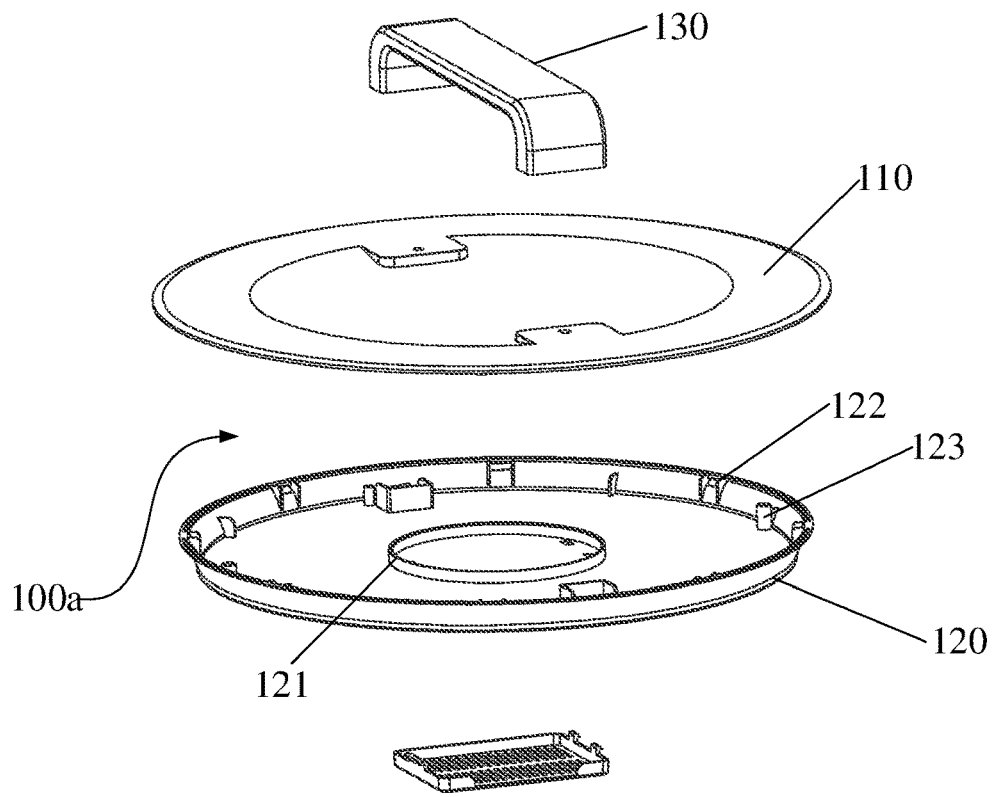
FIG. 3 is a structural schematic view of a barrel cover of the towel heating barrel, viewed from a viewing angle, according to an embodiment of the present disclosure.
Figure 4:
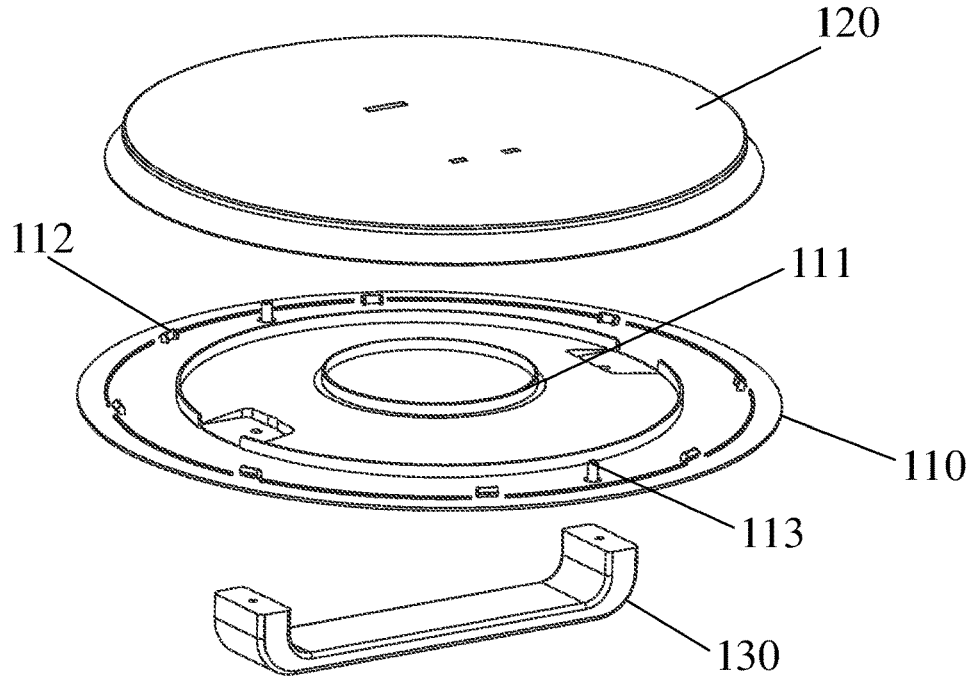
FIG. 4 is a structural schematic view of a barrel cover of the towel heating barrel, viewed from another viewing angle, according to an embodiment of the present disclosure.
Figure 5A:
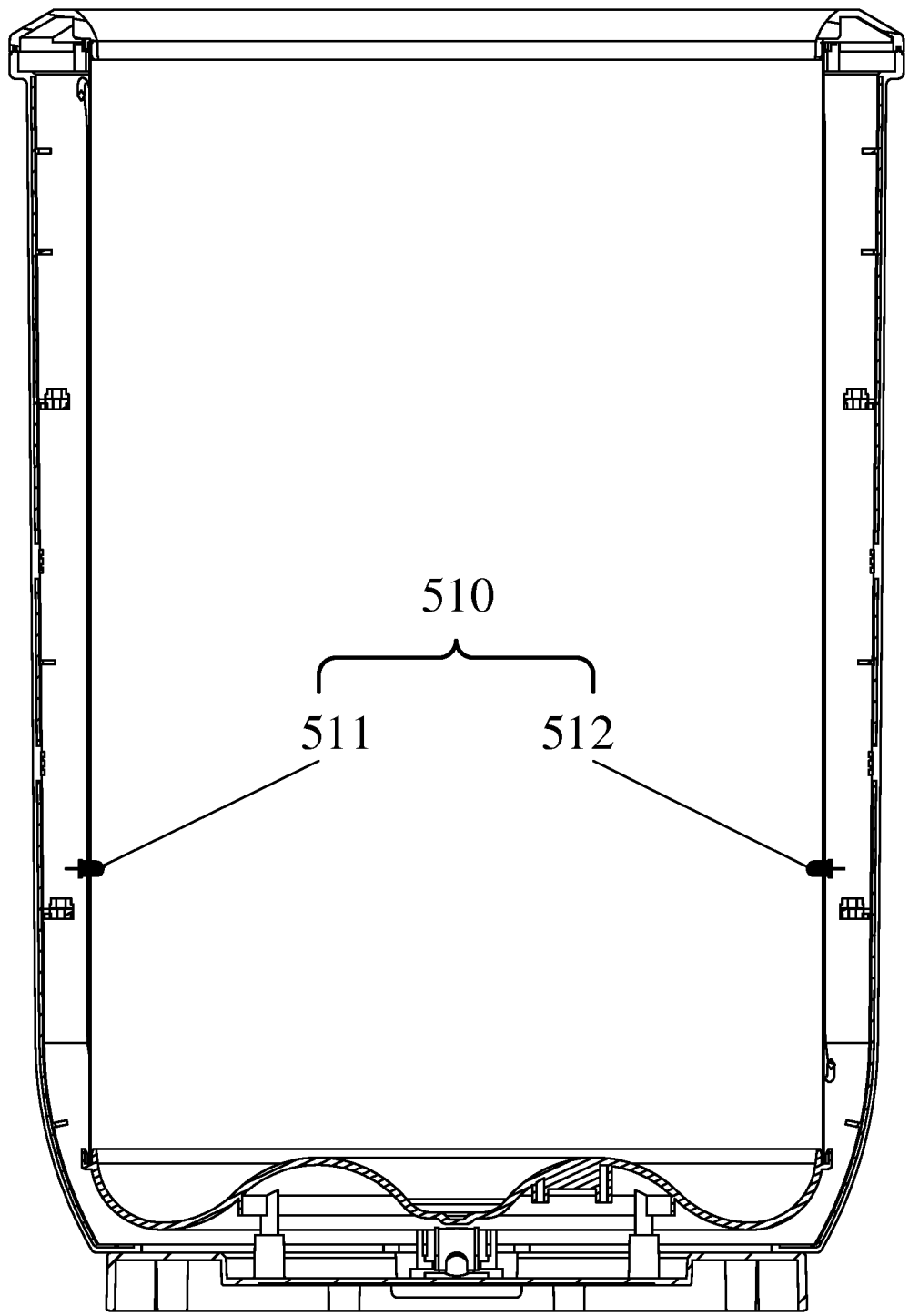
FIG. 5a is a structural schematic view of a first detection assembly of the towel heating barrel according to an embodiment of the present disclosure.
Figure 5B:
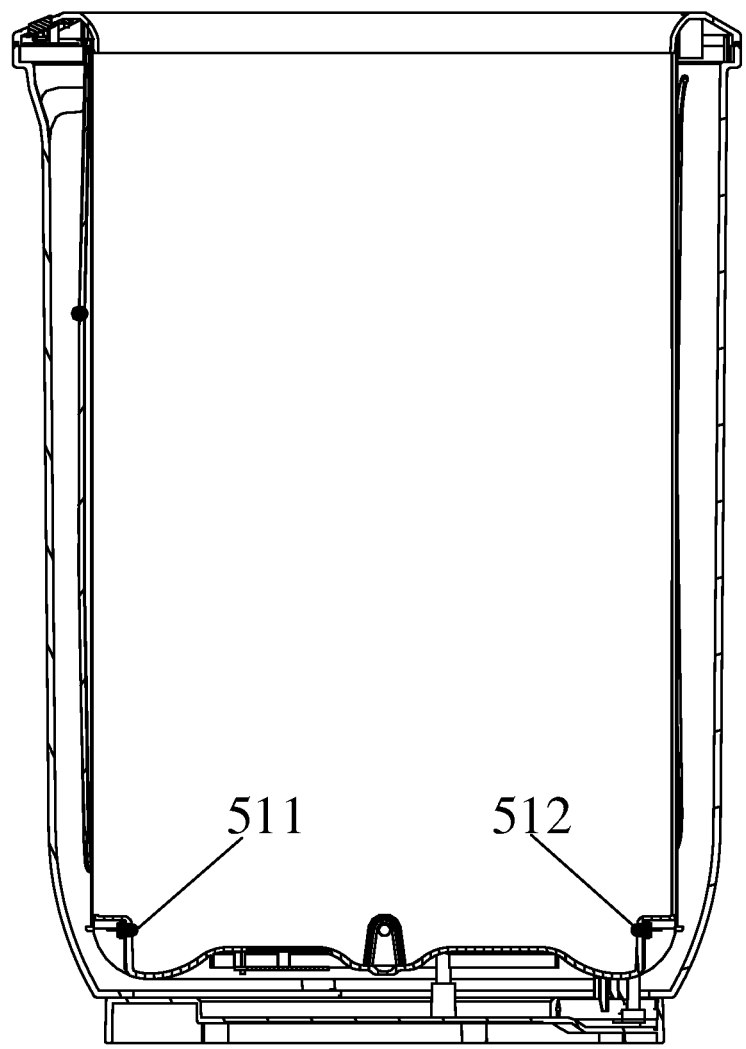
FIG. 5b is a structural schematic view of a first detection assembly of the towel heating barrel according to another embodiment of the present disclosure.
Figure 5C:
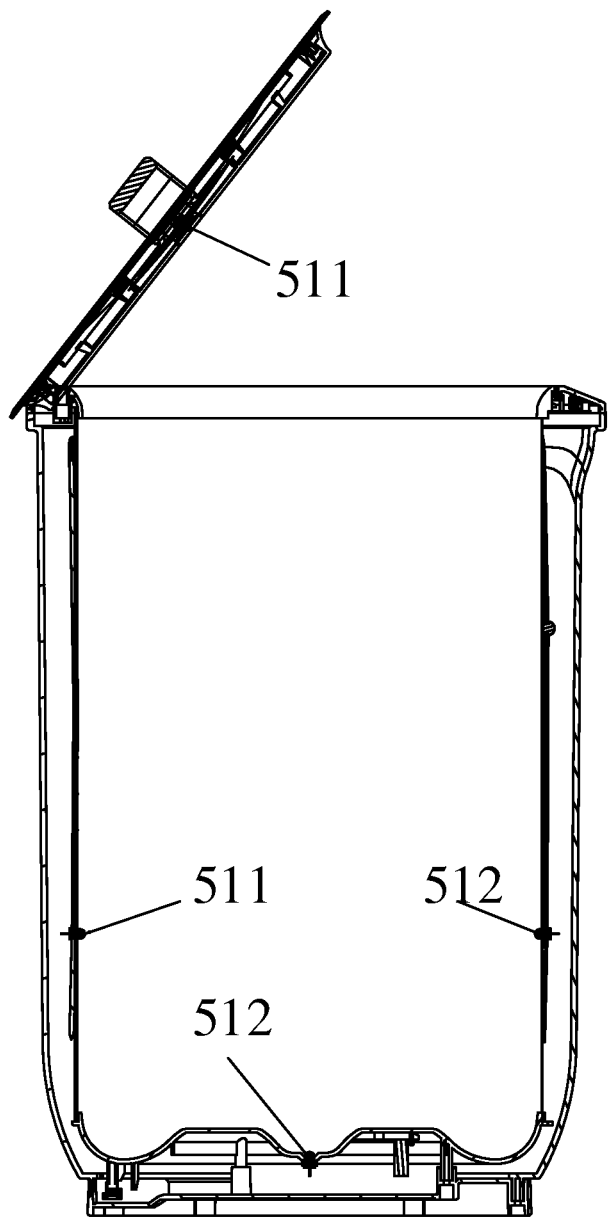
FIG. 5c is a structural schematic view of a first detection assembly of the towel heating barrel according to another embodiment of the present disclosure.
Figure 5D:
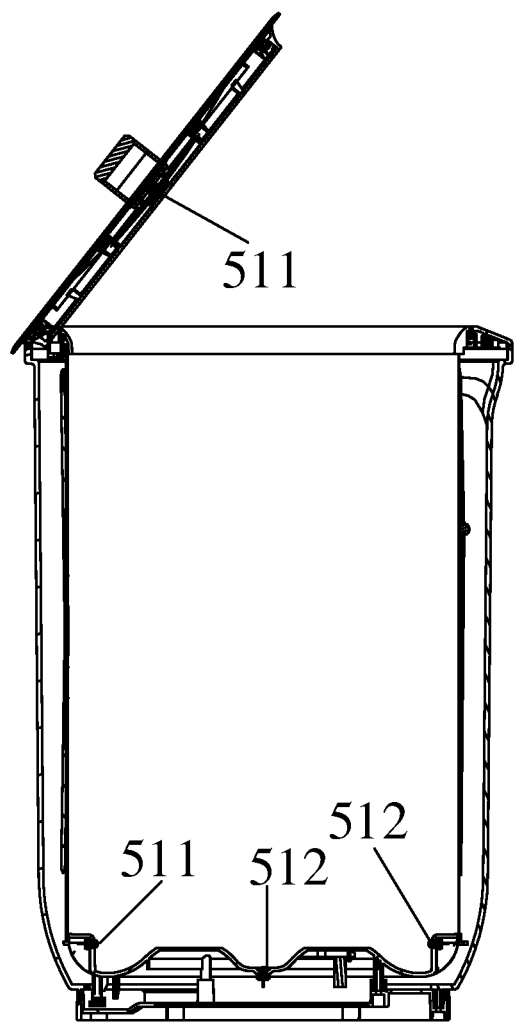
FIG. 5d is a structural schematic view of a first detection assembly of the towel heating barrel according to another embodiment of the present disclosure.
Figure 5E:
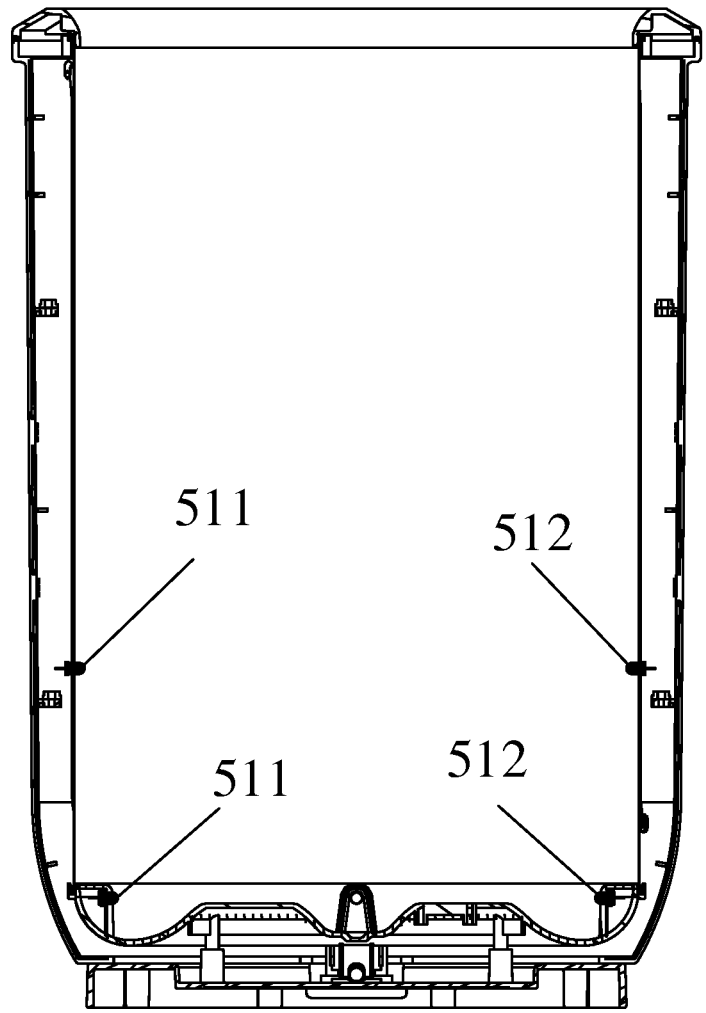
FIG. 5e is a structural schematic view of a first detection assembly of the towel heating barrel according to another embodiment of the present disclosure.

As shown in FIG. 3 and FIG. 4, FIG. 3 is a structural schematic view of the barrel cover of the towel heating barrel, viewed from a viewing angle, according to an embodiment of the present disclosure; and FIG. 4 is a structural schematic view of the barrel cover of the towel heating barrel, viewed from another viewing angle, according to an embodiment of the present disclosure. The barrel cover 100 includes an upper cover 110 and a lower cover 120 connected to the upper cover 110. The upper cover 110 and the lower cover 120 are connected to each other to cooperatively define a cover cavity 100a.

In the present embodiment, when the barrel cover 100 is located at the first position, the barrel cover 100 is closed with respect to an edge of the inner barrel 220 at the opening of the receiving space 200a and an edge of the barrel housing 210 near the opening of the receiving space 200a. In this way, when the barrel cover 100 is at the first position, the barrel cover 100 seals both the receiving space 200a and the barrel gap 220a. In this case, the cover cavity 100a serves as a heat insulation cavity, and the cover cavity 100a and the barrel gap 220a cooperatively insulate the heat in the receiving space 200a of the barrel body 200 from the outside of the entire towel heating barrel.

Specifically, an upper protruding ring 111 is arranged at a center of the upper cover 110. The upper protruding ring 111 is protruding towards the cover cavity 100a. A lower protruding ring 121 is arranged at a center of the lower cover 120. The lower protruding ring 121 is protruding towards the cover cavity 100a. The upper protruding ring 111 and the lower protruding ring 121 fit with each other.

The lower cover 120 has a lower-cover edge portion, and the lower-cover edge portion can be closed with respect to the barrel housing 210. A plurality of lower-cover snap portions 122 are arranged on an inner wall of the lower-cover edge portion facing toward the cover cavity 100a. The upper cover 110 has an upper-cover edge portion. The upper-cover edge portion may be connected to the lower-cover edge portion. A plurality of upper-cover snap portions 112 are arranged on an inner wall of the upper-cover edge portion facing toward the cover cavity 100a. The plurality of lower-cover edge portions 122 and the plurality of upper-cover edge portions 112 are snapped with each other in a one-to-one correspondence manner. For example, one of the lower-cover edge portion 122 and the upper-cover edge portion 112 may be a snap slot, and the other one of the lower-cover edge portion 122 and the upper-cover edge portion 112 may be a snap member that is received in and snapped with the snap slot. Of course, in other embodiments, other types of snap structures may be used.

A plurality of lower-cover positioning structures 123 are arranged on the inner wall of the lower-cover edge portion of the lower cover 120 facing toward the cover cavity 100a; and a plurality of upper-cover positioning structures 113 are arranged on the inner wall of the upper-cover edge portion of the upper cover 110 facing toward the cover cavity 100a. The lower-cover positioning structures 123 and the upper-cover positioning structures 113 may be connected with each other, in a one-to-one correspondence manner, for positioning to enable the upper cover 110 to be connected with the lower cover 120 at a preset position. For example, in some embodiments, the lower-cover positioning structure 123 may be a positioning hole, and the upper-cover positioning structures 113 may be a positioning post that is configured to be inserted into the positioning hole. Of course, in other embodiments, other types of positioning structures may be used.

Therefore, connection between the upper cover 110 and the lower cover 120 is more stable due to connection between the upper protruding ring 111 and the lower protruding ring 121, connection between the upper-cover snap portion 112 and the lower-cover snap portion 122, and connection between the upper-cover positioning structure 113 and the lower-cover positioning structure 123.

In some embodiments, the barrel cover 100 is further arranged with a carrying portion 130 disposed on a side of the upper cover 110 away from the barrel body 200, enabling the user to pick up or open and close the barrel cover 100 more easily.

In some embodiments, the upper cover 110 is made of an anti-static material, such as wood, and the lower cover 120 is made of plastic.

As shown in FIG. 2a, the inner barrel 220 in the present embodiment specifically includes a barrel sidewall 221 and a barrel bottom tray 222 connected to an end of the barrel sidewall 221, i.e., the barrel bottom tray 222 and the barrel cover 100 are disposed at two opposite ends of the barrel sidewall 221. The barrel sidewall 221 and the barrel bottom tray 222 cooperatively define the receiving space 200a. The heating assembly 300 is specifically disposed on the barrel sidewall 221.

The towel heating barrel 1 of the present disclosure further includes a bottom cover 400. The bottom cover 400 is connected to an end of the barrel housing 210 away from the opening of the receiving space 200a to seal an opening of the barrel gap 220a away from the upper cover 100. A mounting space 400a is defined between the bottom cover 400 and the bottom tray 222 of the inner barrel to receive some electronic components, such as a power cord.

Figure 2B:
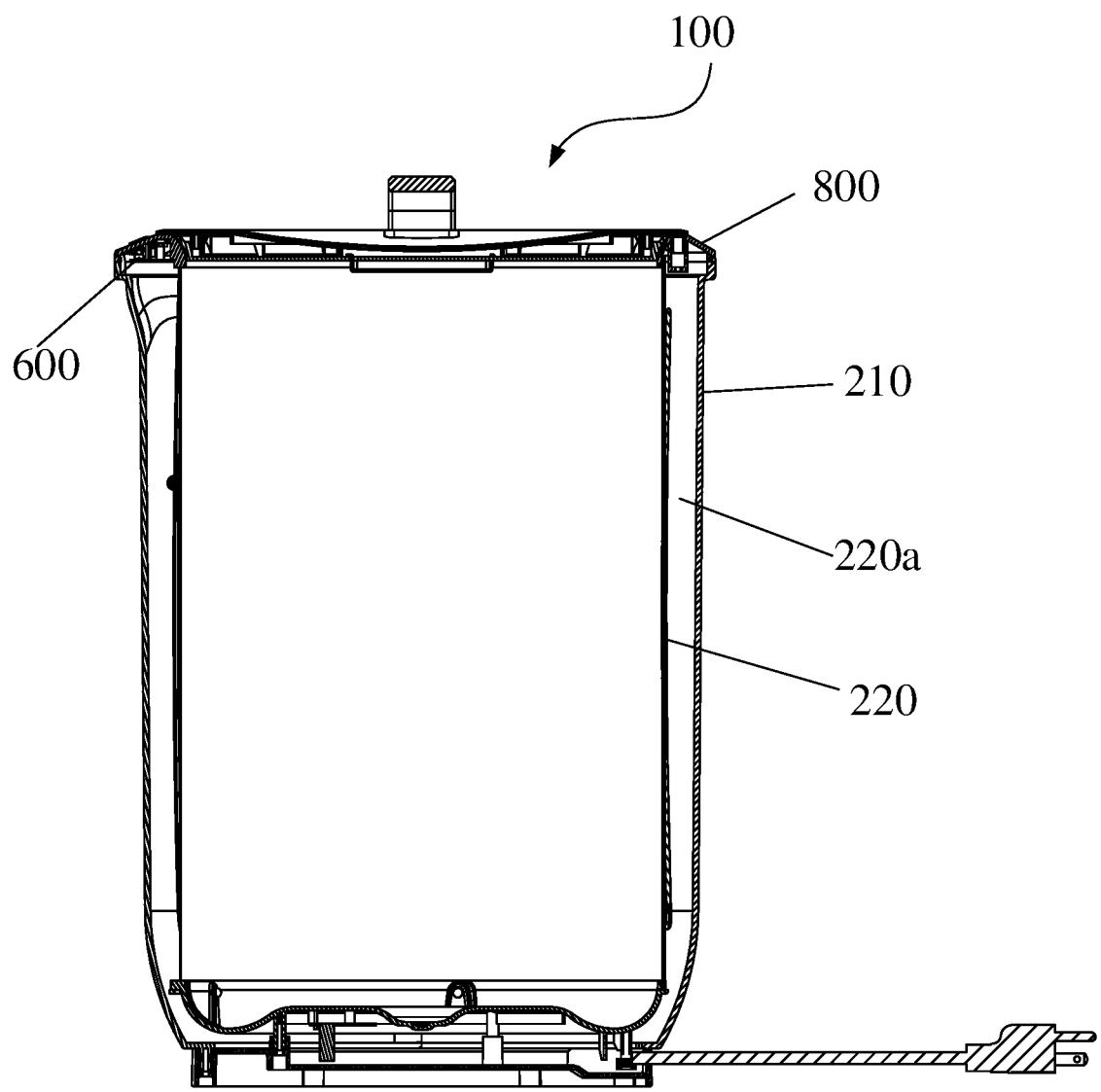
FIG. 2b is a cross-sectional view of the towel heating barrel according to an embodiment of the present disclosure.

As shown in FIG. 2a and FIG. 2b, the towel heating barrel 1 of the present disclosure further includes a flange 800, disposed between the barrel body 200 and the barrel cover 100 to seal any opening between the barrel body 200 and the barrel cover 100. For example, the flange 800 may be fixedly connected to an end of the first housing and an end of the second housing near the barrel cover 100 and may be arranged along a periphery of the opening of the receiving space 200a. The flange 800 may cover the opening of the barrel gap 220a, such that the barrel gap 220a, which serves as a heat insulation space, is completely isolated from the exterior of the entire towel heating barrel 1.

Further, as shown in FIGS. 5a-5e, the towel heating barrel 1 further includes a first detection assembly 510 configured to detect whether the to-be-heated towel is received in the receiving space 200a to obtain a first detection result. To be understood that, in order to ensure safety of the towel heating barrel and prevent a situation where the barrel is dried up at a high temperature due to not receiving any object, the present disclosure provides the first detection assembly to determine whether any to-be-heated object is received in the receiving space 200a. In this way, an operation of the heating assembly (such as a heating power or an operation mode, which will be described in further detail in the following) may be controlled based on at least the first detection result.

Specifically, in the present embodiment, the first detection assembly 510 includes a signal transmitter 511 and a signal receiver 512. A transmitting end of the signal transmitter 511 is disposed facing towards a receiving end of the signal receiver 512. FIGS. 5a-5e show locations where the signal transmitter 511 and the signal receiver 512 are disposed. For example, the signal transmitter 511 and the signal receiver 512 are both disposed on the barrel sidewall 221 facing the receiving space 200a. Alternatively, the signal transmitter 511 and the signal receiver 512 are both disposed on an inner wall of the bottom tray 222 of the inner barrel facing the receiving space 200a. Alternatively, one of the signal transmitter 511 and the signal receiver 512 is disposed on the barrel sidewall 221 facing towards the receiving space 200a, and the other of the signal transmitter 511 and the signal receiver 512 is disposed on the inner wall of the bottom tray 222 facing toward the receiving space 200a. Alternatively, one of the signal transmitter 511 and the signal receiver 512 is disposed on an inner wall of the lower cover 120 facing toward the receiving space 200a, and the other of the signal transmitter 511 and the signal receiver 512 is disposed on the inner wall of the bottom tray 222 facing towards the receiving space 200a. Alternatively, one of the signal transmitter 511 and the signal receiver 512 is disposed on the inner wall of the lower cover 120 facing the receiving space 200a, and the other of the signal transmitter 511 and the signal receiver 512 is disposed on the barrel sidewall 221 facing the receiving space 200a.

It is to be understood that, in order to ensure accuracy of the detection result of the first detection assembly, the number of first detection assemblies may be more than one, i.e., a plurality of sets of signal transmitters 511 and corresponding signal receivers 512. For example, as shown in FIG. 5c-FIG. 5e, and FIG. 6, one set of signal transmitter 511 and signal receiver 512 are disposed on the barrel sidewall of the inner barrel 221 facing the receiving space 200a; and another set of signal transmitter 511 and signal receiver 512 are disposed on the inner wall of the bottom tray 222 facing the receiving space 200a. Alternatively, one set of signal transmitter 511 and signal receiver 512 are disposed on the barrel sidewall of the inner barrel 221 facing the receiving space 200a, and another set of signal transmitter 511 and signal receiver 512 are disposed on the lower cover 120 and the bottom tray 222 respectively. Alternatively, one set of signal transmitter 511 and signal receiver 512 are disposed on the inner wall of the bottom tray 222 facing the receiving space 200a; and another set of signal transmitter 511 and signal receiver 512 are disposed on the lower cover 120 and the bottom tray 222 respectively.

The transmitting end of the signal transmitter 511 is configured to transmit signals, and the receiving end of the signal receiver 512 is configured to receive the signals. Due to the locations where the signal transmitter 511 and the signal receiver 512 are arranged and arranging the transmitting end and the receiving end to be opposite to each other, the signal receiver 512 can receive the signals sent by the signal transmitter 511 and determine, based on the received signals, whether or not there is any towel received in the receiving space 200a. The signal transmitter 511 and the signal receiver 512 may be a pair of photoelectric sensors, or a pair of microwave sensors, or a pair of ultrasonic sensors.

In the present disclosure, when the towel heating barrel is turned on, the towel heating barrel 1 may operate in various modes. Specifically, the towel heating barrel 1 may operate in a heating-up mode, or in a heat preservation mode, or in a de-moist mode.

In an embodiment, when the towel heating barrel 1 is operating in the heating-up mode, the heating assembly 300 is heated at a heating-up power to heat the inner barrel 220 to further heat the towel received in the receiving space 200a. The heating assembly 300 may be triggered, by various ways, to start operating at the heating-up mode to generate heat. In an example, the heating assembly 300 may be automatically (no manual operation is performed) turned on. For example, when the first detection assembly 510 determines that there is towel received in the receiving space 200a, the first detection assembly 510 generates signals and send the signals to a processor to control the heating assembly 300 to heat at the heating-up power. In another example, the heating assembly 300 may be turned on manually based on an operation performed by the user. For example, a button (which may be a physical button or a virtual button on a touch screen) may be arranged on an outer surface of the towel heating barrel 1, and the user may press the button to cause the heating assembly 300 to operate at the heating-up power to generate heat.

Specifically, in the heating-up mode, the heating assembly 300 generates heat at a first heating-up power to heat the inner barrel 220, enabling the inner barrel 220 to reach a first target heating-up temperature. In response the first target heating-up temperature being reached, the heating assembly 300 starts generating heat at a de-moist power. The de-moist power ranges from 5 W to 50 W, which may be 1.5%-18% of the first temperature heating-up power.

To be understood that, since the de-moist power is relatively low, the temperature of the heating assembly 300 is decreased to a second target heating-up temperature when the heating assembly 300 is generating heat at the de-moist power. The second target heating-up temperature is lower than the first target heating-up temperature. In some embodiments, in response to the temperature of the heating assembly 300 being lowered to reach the second target heating-up temperature, the heating assembly 300 starts being heated at a second heating-up power to reach the first target heating-up temperature again. The second heating-up power is lower than the first heating-up power. For example, the second heating-up power may be 40%-60% of the first heating-up power. That is, the heating assembly 300 may be heated at the first heating-up power, the de-moist power, and the second heating-up power, repetitively as described in the above for a predetermined time length.

In a specific example, the heating assembly 300 is firstly heated at the first heating-up power to reach the first target heating-up temperature, such as 100° C. For example, the heating assembly 300 is heated at a power of 280 W-320 W, such as 280 W, 290 W, 300 W, 310 W, 320 W, and the like. The heating assembly 300 subsequently generates heat at the de-moist power to reduce the temperature to reach the second target heating-up temperature. For example, the heating assembly 300 is heated at a power of 10 W-15 W, such as 10 W, 11 W, 12 W, 13 W, 14 W, 15 W, and so on, and the temperature of the heating assembly 300 is decreased to reach 95° C. Further, the heating assembly 300 generates heat at the second heating-up power to reach the first target heating-up temperature again. For example, the heating assembly 300 generates heat at a power of 130 W-160 W, such as 130 W, 135 W, 140 W, 145 W, 150 W, 155 W, 160 W, and so on, to reach 100° C. again. Similarly, the heating assembly 300 is operating at the first heating-up power, the de-moist power, and the second heating-up power, as described in the above repetitively for 20-30 minutes. To be understood that the first target heating-up temperature, the second target heating-up temperature, the first heating-up power, the de-moist power, the second heating-up power, and the predetermined time length may be determined as other values within the corresponding value range. For example, the predetermined time length for which the heating-up mode is performed may be 20 minutes, 22 minutes, 25 minutes, 28 minutes, 30 minutes, and so on.

In an embodiment, the heating assembly 300 may stop, in response to various circumstances, operating in the heating-up mode and generate heat at the de-moist power only. For example, the heating assembly 300 stops operating in the heating-up mode in response to the temperature of the inner barrel 200 reaching either the first target heating-up temperature or the second target heating-up temperature; or in response to the heating member 300 having been operating in the heating-up mode for the predetermined time length; or in response to the first detection assembly 510 determining that no towel is received in the receiving space 200a (such as being removed by the user); or in response to receiving a command input by the user, such as the button arranged on the outer surface the towel heating barrel being pressed by the user.

To be understood that, in the heating-up mode, the inner barrel 220 is heated to reach a relatively high temperature and/or is maintained at the high temperature for a certain period of time. In this way, the towel received in the inner barrel may be sterilized at the high temperature.

In an embodiment, the heating assembly 300 automatically switches, in response to the heating-up mode being terminated, from operating at the heating-up mode to operating at the heat preservation mode. In the heat preservation mode, the heating assembly 300 firstly generates heat at the de-moist power. Since the de-moist power is significantly lower than the first heating-up power, after the heating assembly 300 is operating at the de-moist power for a certain period of time, the temperature of the heating assembly 300 is reduced to reach a first heat preservation temperature. Subsequently, the heating assembly 300 generates heat at the heat preservation power in order to reach a second heat preservation temperature (i.e., an upper limit of a heat-preservation temperature range). Further, the heating assembly 300 repeats the operation of generating heat at the de-moist power and the operation of generating heat at the heat preservation power for a predetermined number of times or for a second predetermined time length. In this way, in the heat preservation mode, the temperature of the heat generating assembly 300 can be maintained in the heat-preservation temperature range formed based on the first heat preservation temperature and the second heat preservation temperature for the second predetermined time length. The heat preservation power is 12%-30% of the first heating-up power, and the second heat preservation temperature is higher than the first heat preservation temperature and lower than the second target heating-up temperature. That is, the upper limit of the heat-preservation temperature range is lower than the lowest target heating-up temperature of the heating-up mode. For example, the heat-preservation temperature range may be a range of 50° C. to 53° C.; a range of 54° C. to 56° C.; a range of 57° C. to 59° C.; a range of 55° C. to 59° C.; a range of 60° C. to 62° C.; a range of 60° C. to 64° C.; a range of 63° C. to 65° C.; a range of 66° C. to 68° C.; a range of 65° C. to 69° C.; a range of 69° C. to 71° C.; a range of 72° C. to 74° C.; a range of 75° C. to 77° C.; or a range of 78° C. to 80° C.

Specifically, in an example, the heating assembly 300 generates heat at the de-moist power to reach the first heat preservation temperature. For example, the heating assembly 300 generates heat at a power of 10 W-15 W, such as being 10 W, 11 W, 12 W, 13 W, 14 W, 15 W, and so on, and the temperature of the heating assembly 300 reaches 54° C. Further, the heating assembly 300 generates heat at the heat preservation power to reach the second heat preservation temperature. For example, the heating assembly 300 generates heat at a power of 40 W-80 W, such as 40 W, 45 W, 50 W, 55 W, 60 W, 65 W, 70 W, 75 W, 80 W, and so on, and the temperature of the heating assembly 300 reaches 56° C. Further, the heat generating assembly generates heat at the de-moist power again to enable the temperature of the heating assembly 300 to be reduced to reach the first heat preservation temperature again. Similarly, the above operations are repeatedly performed for 60 minutes. That is, in the present example, after the heating assembly 300 generates heat, the heating assembly 300 maintains at the heat-preservation temperature range of 54° C.-56° C. for 60 minutes. To be understood that the de-moist power, the heat preservation power, and the second predetermined time length may be determined as other values within the corresponding value range. For example, the second predetermined time length may be any value between 30-240 minutes, such as 30 minutes, 60 minutes, 90 minutes, 120 minutes, 180 minutes, 240 minutes, and the like.

In an embodiment, the heating assembly 300 may stop operating at the heat preservation mode in response to various circumstances. For example, the heating assembly 300 may stop operating at the heat preservation mode, in response to the temperature of the inner barrel 200 having been maintained within the heat-preservation temperature range for the second predetermined time length; or in response to the first detection assembly 510 determining that no towel is received in the receiving space 200a (such as the towel is removed by the user); or in response to receiving a command input by the user, such as the button arranged on the outer surface the towel heating barrel being pressed by the user.

In an embodiment, when the towel heating barrel 1 is operating at the de-moist mode, the heating assembly 300 generates heat at the de-moist power. The de-moist power ranges from 5 W-50 W and may be 1.5%-18% of the heating-up power. In some embodiments, the de-moist power of the de-moist mode is 10 W-50 W, such as 10 W, 15 W, 20 W, 25 W, 30 W, 35 W, 40 W, 45 W, 50 W, and so on.

Specifically, the heating assembly 300 may start operating at the de-moist mode in various situations. For example, the heating assembly 300 starts, in response to stop operating at the heating-up mode, operating at the de-moist mode. That is, after the heating assembly 300 stops operating at the heating-up mode, the heating assembly 300 directly starts operating at the de-moist mode, instead of operating at the heat preservation mode. Alternatively, the heating assembly 300 starts, in response to stop operating at the heat preservation mode, operating at the de-moist mode. Alternatively, the heating assembly 300 starts, in response to the first detection assembly 510 determining that no towel is received in the receiving space 200a, operating at the de-moist mode.

As described in the above, the de-moist power may be applied in any of the heating-up mode, the heat preservation mode and the de-moist mode. However, in different modes, the de-moist power may be applied as different values. For example, in the heating-up mode, the de-moist power may be in a range of 10 W-15 W. In the heat preservation mode, the de-moist power may be in a range of 10 W-15 W. In the de-moist mode, the de-moist power may be 5 W. When the first detection component 510 determines that the receiving space 200a does not receive any towel, the heat assembly 300 does not operate at the heating-up mode or the heat preservation mode, but still operates at the de-moist mode.

That is, in some embodiments, as long as the towel heating barrel 1 of the present disclosure is supplied with power and is turned on, the heating assembly 300 always generates heat at least at the de-moist power regardless of whether the towel is received in the receiving space 200a. The heating assembly switches from operating at the de-moist power to operating at the heating-up power or at the heat preservation power only when the towel heating barrel 1 has started operating at the heating-up mode or the heat preservation mode. It can be seen that as long as the towel heating barrel 1 of the present disclosure is not disconnected from the power, the heating assembly 300 constantly generates heat.

Alternatively, in some embodiments, when the towel heating barrel is still turned on, the heating assembly may stop generating heat in response to various commands. For example, the heating assembly may stop generating heat in response to a stop command input by the user; or the heating assembly may stop generating heat in response to the barrel being operating at the de-moist mode for a certain period of time. That is, when the towel heating barrel is still turned on, the heating assembly generating heat at the de-moist power or completely stopping generating heat is controllable either in an automatic manner or by manual operations.

When the towel heating barrel cools down naturally after the heating-up/heat preservation mode is stopped, the towel heating barrel may absorb moisture from the environment. In addition, the inner barrel 220 is made of metal in order to ensure the heat generated by the heating assembly to be transferred to the inner barrel effectively. Therefore, absorption of the ambient moisture for a long period of time may result in the inner barrel being rusting or damages to circuits inside the barrel. Therefore, even after the towel is removed out of the receiving space, the inner barrel is still heated by the heating assembly at a certain power to ensure that moisture does not condensate at the inner barrel 220 and the inner barrel is not excessively dried up. Moreover, since the de-moist power is relatively low, the temperature of the inner barrel 220 is not excessively high, and the user may not be burnt. When the towel is received in the receiving space 200a but the heating-up mode and the heat preservation mode are terminated, the de-moist mode also prevents the towel itself from absorbing the ambient moisture, and therefore, the towel is less likely to be moldy.

Figure 7:
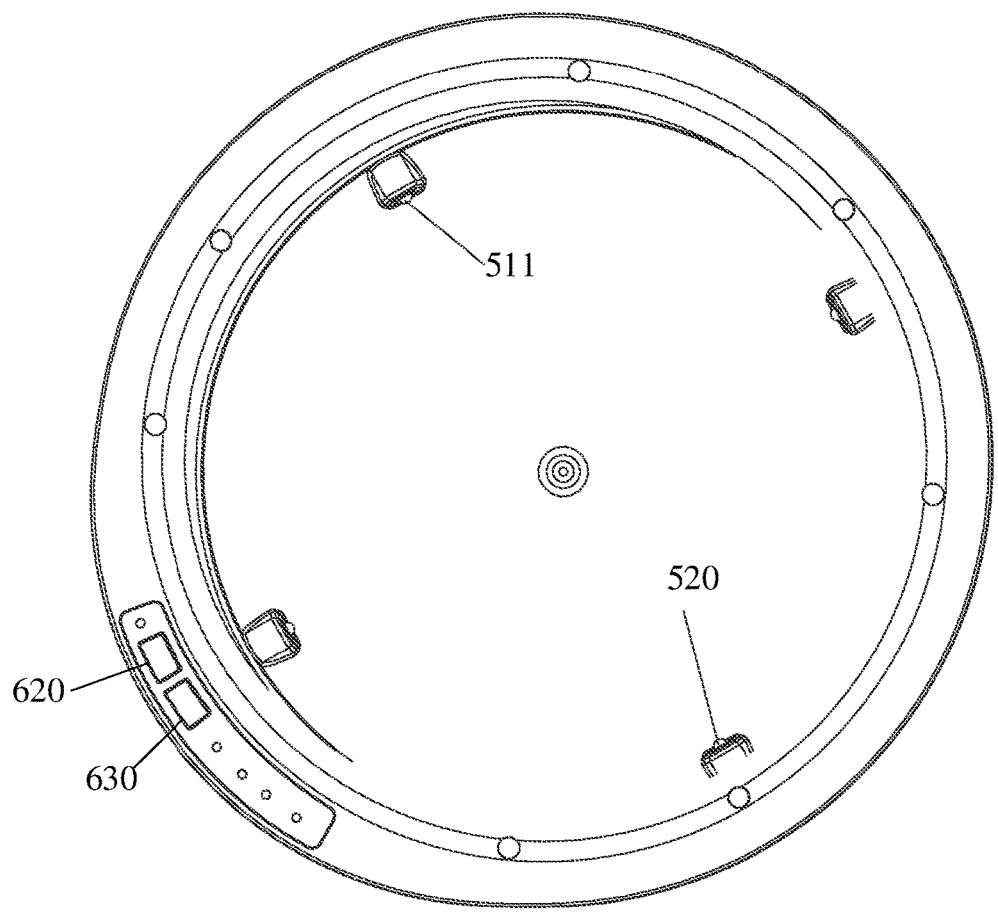
FIG. 7 is a top view of the towel heating barrel according to an embodiment of the present disclosure.
Figure 8:
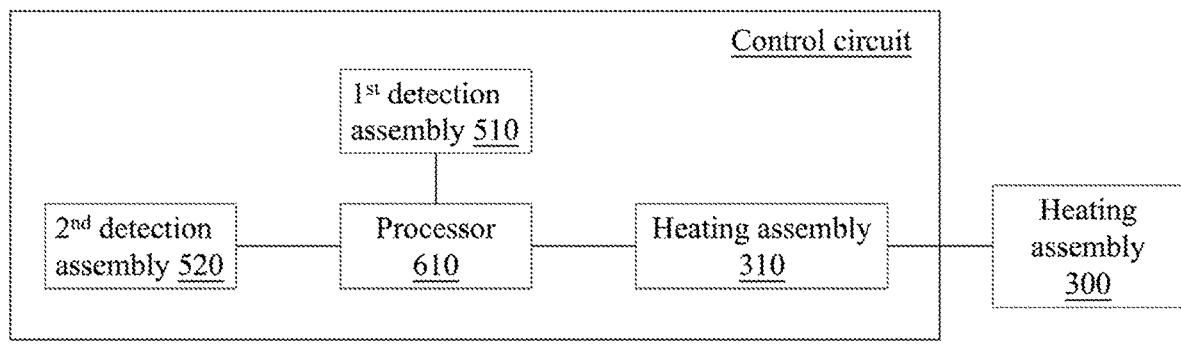
FIG. 8 is a structural diagram of a control circuit of the towel heating barrel according to an embodiment of the present disclosure.

In order to achieve intelligent control of the towel heating barrel 1, the towel heating barrel 1 in the present disclosure is arranged with a control circuit board 600 (as shown in FIG. 2a and FIG. 2b), the control circuit board is arranged in the flange 800. The control circuit board 600 has a control circuit and a plurality of buttons connected to the control circuit, such as the button that can be pressed by the user to output commands as described in the above embodiment. As shown in FIG. 7 and FIG. 8, a body of the control circuit board 600 is mounted in the flange 800, and the plurality of buttons are exposed from an outer surface of the flange 800. The plurality of control buttons is configured to receive commands input by the user and transmit the commands to the control circuit. The control circuit, as shown in FIG. 8, includes a processor 610 and a heating circuit 310 connected to the processor 610. The first detection assembly 510 is connected to the processor 610 and sends signals to the processor 610. The processor 610 controls the operation of the heating circuit 310 based on the signals sent by the first detection assembly 510 and/or user commands input from the buttons. The heating circuit 310 further controls the operation of the heating assembly 300 (i.e., start/stop operating at a certain mode or a certain power) based on the control from the processor 610.

Specifically, the processor 610 controls the heating circuit 310 to further control the heating assembly 300 to be heated at the heating-up power in response to receiving at least one of a low voltage level signal and a start command input by the user. That is, the processor, in response to receiving the low voltage level signal, automatically controls the heating circuit 310 to heat the heating assembly 300 at the heating-up power. Alternatively, the processor, in response to receiving the low voltage level signal and the start command input by the user, automatically controls the heating circuit 310 to heat the heating assembly 300 at the heating-up power. Alternatively, the processor, in response to receiving the start command input by the user but without the low voltage level signal, automatically controls the heating circuit 310 to heat the heating assembly 300 at the heating-up power.

In an embodiment, when the first detection assembly 510 detects that the towel is received in the receiving space 200a, the signal receiver 512 generates a first low voltage level signal and sends the first low voltage level signal to the processor 610. The processor 610, in response to receiving the first low voltage level signal, determines that the received signal is the low voltage level signal and automatically controls the heating circuit 310 to heat the heating assembly 300 at the heating-up power.

In an embodiment, when the first detection assembly 510 detects that the towel is received in the receiving space 200a, the signal receiver 512 generates the first low voltage level signal and sends the first low voltage level signal to the processor 610. The processor 610, in response to receiving the first low voltage level signal, determines that the received signal is the low voltage level signal. However, in this case, the processor 610 does not immediately control the heating circuit 310 to heat the heating assembly but waits for the start command input from the button. When the button receives the start command and sends the start command to the processor 610, the processor controls the heating circuit 310 to heat the heating assembly 300 to further heat the inner barrel 220. The button may be a "start" button 620 (i.e., a physical button or a virtual button on a touch panel). When the user presses the "start" button, the start command is generated and is transmitted to the processor 610.

In an embodiment, regardless of whether the first detection assembly 510 sends the low voltage level signal to the processor, the processor controls the heating circuit 310 to heat the heating assembly 300 whenever the button receives the start command and sends the start command to the processor 610.

In an embodiment, as described in the above, the processor controls the heating circuit 310 to further control the heating assembly 300 to stop operating at the heating-up power in response to receiving at least one of a high voltage level signal and a stop command.

In one case, when the first detection assembly 510 detects that no towel is received in the receiving space 200a, the signal receiver 512 generates a first high voltage level signal and sends the first high voltage level signal to the processor 610. The processor 610, in response to receiving the first high voltage level signal, determines that the received signal is the high voltage level signal and automatically controls the heating circuit 310 to control the heating assembly 300 to stop heating at the heating-up power. In this way, the towel heating barrel 1 automatically stops heating when no towel or any object to is received in the receiving space, such that intelligent operation is achieved.

In another case, when the button receives the stop command and sends the stop command to the processor 610, the processor controls the heating circuit 310 to control the heating assembly 300 to stop operating at the heating-up power regardless of whether the first detection assembly 510 sends the high voltage level signal to the processor. The button may be a "stop" button 630 (a physical button or a virtual button on a touch panel), and when the user presses the "stop" button, the stop command is generated and is transmitted to the processor 610. It is will be understood that the "start" button 620 and the "stop" button 630 may be the same button in other embodiments.

Based on the above embodiments, the detection result obtained by the first detection assembly 510 is used to control the heating assembly to start generating heat; and/or stop generating heat; and/or changing the heating power (i.e., switching between operating modes). Alternatively, the heating assembly may be responding to other controls and do not respond to the detection result obtained by the first detection assembly 510. For example, the user may input certain commands, and the heating assembly may be controlled based on the certain commands with priority.

Figure 6:
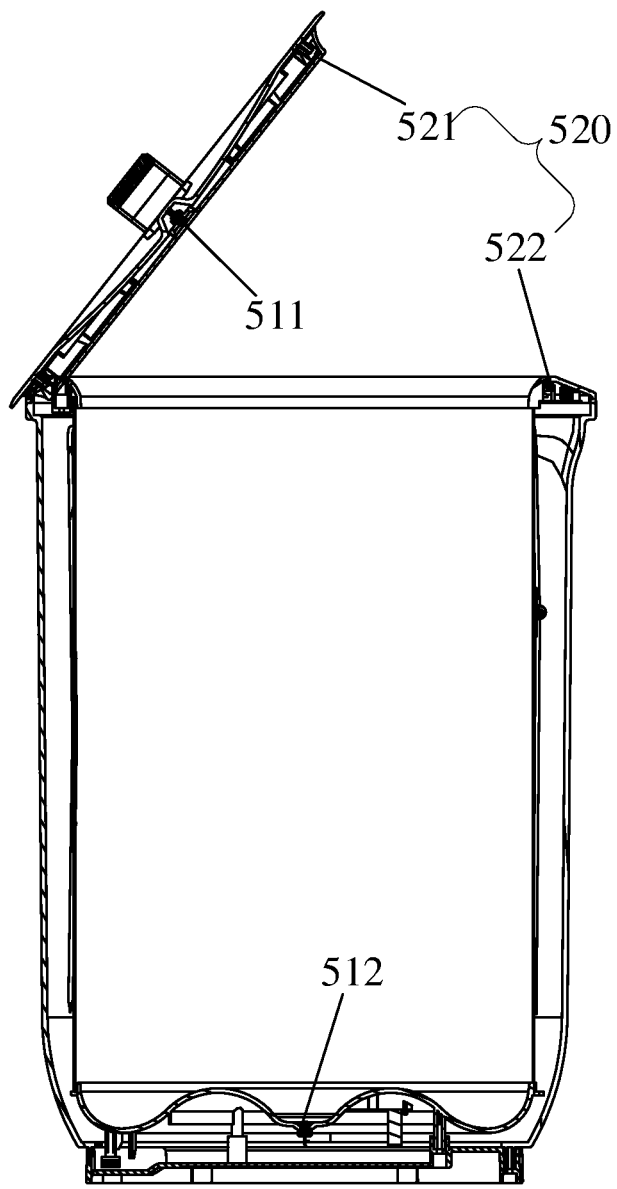
FIG. 6 is a structural schematic view of a second detection assembly of the towel heating barrel according to an embodiment of the present disclosure.

Further, as shown in FIG. 6, the towel heating barrel 1 is further arranged with a second detection assembly 520 to detect the position of the barrel cover 100, i.e., detect whether the barrel cover 100 is disposed at the first position (the barrel cover being closed with respect to the barrel body 200 to seal the opening of the receiving space) or the second position (the barrel cover being open relative to the barrel body 200 to expose at least a portion of the opening). Specifically, the second detection assembly 520, which is configure to detect the position of the barrel cover 100, is arranged and is electrically connected to the processor 610 (as shown in FIG. 8), it is determined whether the barrel cover 100 is closed with the barrel body 200, and position information of the barrel cover 100 is transmitted to the processor to enable the processor to control the heating circuit 310 and the heating assembly 300 accordingly. In this way, the user may not be burnt when opening the barrel cover to take the towel during the heating assembly being operating at the high heating power, such that the user may use the towel heating barrel safely.

Specifically, the second detection assembly 520 is disposed at an edge of the barrel cover 100 and/or an edge of the barrel body 200. For example, in the present embodiment, a pivot mechanism is arranged at a connection position to enable the barrel cover 100 to flip to be closed or opened with respect to the barrel body 200. In this case, the second detection assembly 520 may be disposed at a closing position, which is opposite to the connection position. For example, the second detection assembly 520 includes a first sensor 521 and a second sensor 522. The first sensor 521 is disposed at the closing position of the barrel cover 100, and the second sensor 522 is disposed at the closing position of the barrel housing 210. A line connecting the connection position with the closing position passes through a central axis of the barrel body. In this way, when the second detection assembly 520 determines whether the barrel cover 100 is closed with respect to the barrel body 200, it is accurately determined whether the barrel cover 100 has completely closed with respect to the barrel body 200 (completely seal the entire opening of the receiving space 200a). In other embodiments, other types of mechanisms may be configured to serve as the second detection assembly, as long as the position of the barrel cover 100 with respect to the barrel body 200 can be determined accurately.

The second detection assembly 520 generates a corresponding voltage level signal based on the detected position of the barrel cover 100 (first position or second position) and transmits the generated voltage level signal to the processor, such that the processor 610 controls the operation of the heating circuit 310 based on the voltage level signal.

Specifically, when the second detection assembly 520 detects that the barrel cover 100 is disposed at the first position, i.e., when the barrel cover 100 is closed with respect to the barrel body 200 to close the opening of the receiving space 200a, the second detection assembly 520 (which may be the first sensor 521 and/or the second sensor 522) generates a second low voltage level signal and transmits the second low voltage level signal to the processor 610. When the second detection assembly 520 detects that the barrel cover 100 is disposed at the second position, i.e., when the voltage cover 100 is opened with respect to the barrel body 200 to expose at least a portion of the opening of the receiving space 200a, the second detection assembly 520 (which may be the first sensor 521 and/or the second sensor 522) generates a second high voltage level signal and transmits the second high voltage level signal to the processor 610.

That is, in the present embodiment, the processor receives the voltage level signal sent by the first detection assembly 510 and the voltage level signal sent by the second detection assembly 520. When the processor receives the first low voltage level signal sent by the first detection assembly 510 and the second low voltage level signal sent by the second detection assembly 520, the received signal is determined to be the low voltage level signal. When the processor receives at least one of the first high voltage level signal and the second high voltage level signal, the received signal is determined to be the high voltage level signal. Similar to the above embodiment, the processor controls the heating circuit 310 to heat the heating assembly 300 at the heating-up power in response to receiving at least one of the low voltage level signal and the start command input by the user.

The towel heating barrel is further arranged with an indication lamp. When the towel heating barrel is operating at the heating-up mode and the heat preservation mode, and when the temperature of the heating assembly is greater than a temperature threshold, the indication lamp may emit light. In this way, the user is reminded that the temperature of the heating assembly is high and the towel shall not be taken out of the receiving space.

Further, as shown in FIG. 2a, the towel heating barrel 1 further includes a power supply circuit board 700. The power supply circuit board 700 includes: a power port, configured to connect to a power supply, such as a power source disposed outside of the towel heating barrel 1, to supply power to all electronic structures arranged in the towel heating barrel; and a converter, configured to convert an alternating current (AC) signal to an AC over-zero signal.

In the present embodiment, the power supply circuit board 700 is received in the mounting space 400a between the bottom tray 222 of the inner barrel and the bottom cover 400. The control circuit board 600 is mounted on the flange. In this way, the control circuit, which is configured to control the heating assembly to start/stop operating and control the heating power of the heating assembly, and the power supply circuit, which is configured to manage power supply, are respectively disposed at a top portion of the barrel body 200 and received in the mounting space 400a of bottom cover of the barrel. In this way, the two circuits are prevented from occupying a space at an intermediate of the barrel body, such that a utilization rate of the receiving space 200a is improved.

It will be understood that the processor 610 of the present disclosure may be an integrated circuit chip or a general purpose processor, having signal processing capabilities. The processor 610 may be a general-purpose processor, a digital signal process, or other programmable logic devices, a discrete gate or transistor logic device, a discrete hardware component, and so on. The general purpose processor may be a microprocessor or any conventional processor.

According to the present disclosure, the towel heating barrel is arranged with the first detection assembly, configured to detect whether the towel is received in the receiving space to obtain a first detection result, and a heating assembly, configured to heat the inner barrel and to be controlled to stop heating based on the first detection result. In this way, the towel heating barrel may automatically control the heating assembly to stop heating at the heating-up power or the heat preservation power depending on whether the towel is received in the receiving space. The inner barrel is prevented from being dry heated, and automatic control for the operation of the heating assembly is achieved. The towel heating barrel is more intelligent and safer.

Since the heating assembly is operating constantly at the de-moist power at all times other than the heating-up mode and the heat preservation mode, the inner barrel does not cool down when the heating-up mode and the heat preservation mode are terminated. Therefore, moisture is not collected in the inner barrel. When the heating assembly is operating at the de-moist power, the heating assembly is heated at a lower power, and therefore, the inner barrel is not dry burnt, and moisture condensation is prevented. When the towel is received in the receiving space, the heating assembly being heated at the de-moist power prevents the towel itself from absorbing the moisture, such that the towel is less likely to be moldy.

In the heat preservation mode, a plurality of heat-preservation temperature ranges are set, and the temperature of the heating assembly is maintained within any one range selected from the plurality of heat-preservation temperature ranges. By setting the plurality of heat-preservation temperature ranges and allowing any one of the plurality of heat-preservation temperature ranges to be selected, the user may determine the appropriate heat-preservation temperature range according to actual demands or an instant application scenario. The towel heating barrel may be applicable for different users or different application scenarios.

The terms "first", "second", "third", "fourth", and so on, in the specification and claims and the accompanying drawings of the present disclosure are used to distinguish similar objects and are not used to describe a particular order or sequence. It should be understood that features defined by the term may be interchangeable if appropriate, such that the embodiments described herein may be implemented in an order other than what is illustrated or described herein. In addition, the terms "include", "have", and any variations thereof, are intended to cover non-exclusive embodiments. For example, a process, a method, a system, a product, or a device including a series of operations or units are not limited to the listed operations or units, but may further include operations or units that are inherently included in the process, the method, the system, the product, or the device.

The above-described embodiments show only various embodiments of the present disclosure, which are described more specifically and in more details, but the description shall not be interpreted as limiting the scope of the present disclosure. Any ordinary skilled person in the art may perform deformations and improvements without departing from the concept of the present disclosure, and the deformations and improvements shall fall within the scope of the present disclosure. Therefore, the scope of the present disclosure shall be subject to the attached claims.

What is claimed is:

1. A towel heating barrel, comprising:
   a barrel body, having a receiving space to receive a to-be-heated object;
   a barrel cover, connected to the barrel body and capable of being disposed at a first position or a second position, wherein the first position is the barrel cover being closed with respect to the barrel body to close an opening of the receiving space; the second position is the barrel cover being open with respect to the barrel body to expose at least a portion of the opening of the receiving space;
   a first detection assembly, configured to detect whether the to-be-heated object is received in the receiving space to obtain a first detection result, wherein the first detection result indicates that the to-be-heated object is received in the receiving space or indicates that the to-be-heated object is not received in the receiving space; and
   a heating assembly, arranged on the barrel body to heat the barrel body to further heat the to-be-heated object received in the receiving space, wherein the heating assembly is configured to selectively generate heat based on the first detection result;
   wherein when the first detection result indicates that the to-be-heated object is received in the receiving space, the heating assembly generate heat at a target heating power; and when the heating assembly is generating heat at a target heating power and the first detection result indicates that the to-be-heated object is not received in the receiving space, the heating assembly stops generating heat at the target heating power;

the first detection assembly comprises a signal transmitter and a signal receiver; the signal receiver is configured to receive signals emitted by the signal transmitter to determine whether the to-be-heated object is received in the receiving space;

the towel heating barrel further comprises a processor and a heating circuit, wherein the processor is connected to the first detection assembly and the heating circuit and is configured to receive a voltage signal; and the processor is further configured to: control the heating circuit to control the heating assembly to stop generating heat at the target heating power in response to the received voltage signal being a high voltage level signal; or control the heating circuit to control the heating assembly to start generating heat at the target heating power in response to the received voltage signal received being a low voltage level signal;

wherein the processor is configured to: control the heating circuit to control the heating assembly to generate heat at a power of less than 50W in response to the towel being not received in the receiving space and the heating assembly having stopped generating heat at the target power.

2. The towel heating barrel according to claim 1, wherein, the signal transmitter and the signal receiver are both disposed on a side wall of the receiving space; or
the signal transmitter and the signal receiver are both disposed on a bottom wall of the receiving space; or
one of the signal transmitter and the signal receiver is disposed on the side wall of the receiving space, and the other of the signal transmitter and the signal receiver is disposed on the bottom wall of the receiving space; or
one of the signal transmitter and the signal receiver is disposed on an inner face of the barrel cover facing towards the receiving space, and the other of the signal transmitter and the signal receiver is disposed on the side wall of the receiving space; or
one of the signal transmitter and the signal receiver is disposed on the inner face of the barrel cover facing towards the receiving space, and the other of the signal transmitter and the signal receiver is disposed on the bottom wall of the receiving space.

3. The towel heating barrel according to claim 1, wherein, the first detection assembly comprises: a set of photoelectric sensors, or a set of microwave sensors, or a set of ultrasonic sensors.

4. The towel heating barrel according to claim 1, wherein the processor is configured to:
receive a first low voltage level signal and send the first low voltage level signal to the processor in response to the first detection assembly detecting that the to-be-heated object is received in the receiving space; or
receive a first high voltage level signal and send first high voltage level signal to the processor in response to the first detection assembly detecting that no to-be-heated object is received in the receiving space.

5. The towel heating barrel according to claim 4, wherein the processor is configured to:
determine, in response to receiving the first low voltage level signal, that the received voltage signal is the low voltage level signal; or
determine, in response to receiving the first high voltage level signal, that the received voltage signal is the high voltage level signal.

6. The towel heating barrel according to claim 4, further comprising a second detection assembly, wherein the second detection assembly is disposed at an edge of the barrel cover and is configured to determine that the barrel cover is located at the first position or at the second position; and the second detection assembly is connected to the processor and configured to:
generate a second low voltage level signal and send the second low voltage level signal to the processor in response to the barrel cover being determined as being disposed at the first position; or
generate a second high voltage level signal and send the second high voltage level signal to the processor in response to the barrel cover being determined as being disposed at the second position.

7. The towel heating barrel according to claim 6, wherein the processor is configured to:
determine, in response to receiving the first low voltage level signal and the second low voltage level signal, that the received voltage signal is the low voltage level signal; or
determine, in response to receiving at least one of the first high voltage level signal and the second high voltage level signal, that the received voltage signal is the high voltage level signal.

8. The towel heating barrel according to claim 1, further comprising a stop button, disposed on the barrel cover, wherein,
the stop button is electrically connected to the processor; and
the stop button, when being pressed, is configured to control the processor to control the heating circuit to control the heating assembly to stop generating heat at the target heating power.

9. The towel heating barrel according to claim 1, further comprising a start button, disposed on the barrel cover, wherein,
the start button is electrically connected to the processor; and
the processor is configured to control the heating circuit to control the heating assembly to start generating heat at the target heating power in response to the processor receiving the low voltage level signal and the start button being pressed;
the processor is configured to control the heating circuit to control the heating assembly to stop generating heat at the target heating power in response to the processor receiving the high voltage level signal and the start button being long-pressed.

10. The towel heating barrel according to claim 1, wherein the barrel cover comprises an upper cover and a lower cover connected to the upper cover; the lower cover and the upper cover cooperatively define a cover cavity to serve as a heat insulation cavity for insulating heat in the receiving space from an outside of the towel heating barrel.

11. The towel heating barrel according to claim 10, wherein the upper cover is made of anti-static material; the lower cover is made of plastic.

12. The towel heating barrel according to claim 1, wherein the barrel body comprises an inner barrel, a first housing and a second housing;
the inner barrel has the receiving space;

the first housing and the second housing are symmetrical to each other; and the first housing is connected to the second housing by connecting members to cooperatively cover an outer peripheral wall of the inner barrel.

13. The towel heating barrel according to claim 12, further comprising a bottom cover, wherein the barrel body further comprises a bottom tray; the bottom tray is connected to an end of the inner barrel away from the barrel cover, the bottom tray and the inner barrel cooperatively define the receiving space; and the bottom cover and the bottom tray cooperatively define a mounting space.

14. The towel heating barrel according to claim 13, further comprising a power supply circuit board; wherein the power supply circuit board comprises:

a power port, configured to connect to a power supply to supply power to all electronic structures arranged in the towel heating barrel; and a converter, configured to convert an alternating current (AC) signal to a direct current signal;

wherein the power supply circuit board is received in the mounting space.

15. The towel heating barrel according to claim 12, further comprising a control circuit board; wherein the barrel body further comprises a flange, the flange is connected to an end of the first housing and the second housing; the control circuit board comprises a processor, the processor is configured to control the heating assembly to start or stop generating heat and control a heating power of the heating assembly; and the control circuit board is mounted on the flange.

16. The towel heating barrel according to claim 1, wherein the heating assembly is configured to:

generate heat at a heating-up power to heat the barrel body, wherein a temperature of the heating assembly reaches and is maintained at a target heating-up temperature range; and generate heat at a de-moist power at all times other than a time period of generating heat at the heating-up power;

wherein the de-moist power is in a range of 5W-50 W and is 1.5%-18% of the heating-up power.

17. The towel heating barrel according to claim 1, wherein, the heating assembly is configured to start generating heat at a target heating power in response to the first detection assembly detecting that the to-be-heated object is received in the receiving space; or the heating assembly is configured to stop generating heat at a target heating power in response to the first detection assembly detecting that no to-be-heated object is received in the receiving space.

* * * * *